United States Patent
Noguchi

(10) Patent No.: US 11,391,949 B2
(45) Date of Patent: Jul. 19, 2022

(54) DISPLAY DEVICE AND DISPLAY METHOD OF IMAGE

(71) Applicant: SEIKO EPSON CORPORATION, Tokyo (JP)

(72) Inventor: Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 268 days.

(21) Appl. No.: 16/854,163

(22) Filed: Apr. 21, 2020

(65) Prior Publication Data

US 2020/0333603 A1    Oct. 22, 2020

(30) Foreign Application Priority Data

Apr. 22, 2019    (JP) .............................. JP2019-080697
Jan. 28, 2020    (JP) .............................. JP2020-011413

(51) Int. Cl.
| | | |
|---|---|---|
| *G02B 27/00* | (2006.01) | |
| *G02B 27/01* | (2006.01) | |
| *F21V 8/00* | (2006.01) | |
| *G03H 1/02* | (2006.01) | |
| *G09G 5/02* | (2006.01) | |
| *G02B 5/32* | (2006.01) | |

(52) U.S. Cl.
CPC ........... *G02B 27/0172* (2013.01); *G02B 5/32* (2013.01); *G02B 6/005* (2013.01); *G02B 6/0026* (2013.01); *G03H 1/0248* (2013.01); *G09G 5/02* (2013.01); *G02B 2027/0178* (2013.01); *G09G 2354/00* (2013.01)

(58) Field of Classification Search
CPC .... G02B 27/0172; G02B 5/32; G02B 6/0026; G02B 6/005
See application file for complete search history.

(56) References Cited

U.S. PATENT DOCUMENTS

| | | | | |
|---|---|---|---|---|
| 2003/0169469 A1* | 9/2003 | Takada | ..................... | G02B 5/32 |
| | | | | 359/24 |
| 2014/0022284 A1* | 1/2014 | Chosokabe | .......... | G02B 27/017 |
| | | | | 345/633 |
| 2017/0353628 A1* | 12/2017 | Kishigami | .......... | H04N 1/6077 |

(Continued)

FOREIGN PATENT DOCUMENTS

| | | |
|---|---|---|
| JP | 2005-241825 A | 9/2005 |
| JP | 2008-287049 A | 11/2008 |

(Continued)

*Primary Examiner* — Sarah Lhymn
(74) *Attorney, Agent, or Firm* — Oliff PLC

(57) ABSTRACT

Provided is a display method for displaying an image based on a color original image. The display method includes guiding an image light corresponding to the color original image to a display position by an optical system, and deflecting a traveling direction of the image light to an observer and performing display by a diffraction optical element. At the time of displaying the color original image, the image light entering the first diffraction optical element includes a light entering at a first angle and a light entering at a second angle that is larger than the first angle, a chromaticity range of the image of the color original image at a position corresponding to the light entering at the first angle is limited to be close to a chromaticity range of the light entering at the second angle.

12 Claims, 14 Drawing Sheets

(56) References Cited

U.S. PATENT DOCUMENTS

2018/0239150 A1* 8/2018 Yoshida ............. G02B 27/0172
2019/0146221 A1* 5/2019 Oku ....................... G02B 6/005
                                                        359/13

FOREIGN PATENT DOCUMENTS

| JP | 2009036955 A | * | 2/2009 |
| JP | 2010-044172 A |   | 2/2010 |
| JP | 2016006416 A | * | 1/2016 |
| JP | 2016167041 A | * | 9/2016 |

* cited by examiner

DISPLAY DEVICE AND DISPLAY METHOD OF IMAGE

The present application is based on, and claims priority from JP Application Serial Number 2019-080697, filed Apr. 22, 2019, and JP Application Serial Number 2020-011413, filed Jan. 28, 2020, the disclosure of which is hereby incorporated by reference herein in its entirety.

BACKGROUND

1. Technical Field

The present disclosure relates to a display device including a diffraction optical element and a display method thereof.

2. Related Art

In recent years, various types of an eyeglass display device have been proposed. Reduction in device size and reduction in thickness have been demanded for such display device regardless of whether the display device itself is a see-through type having high transmittance and enabling an outside scene to be visually recognized. The display device includes an image formation unit that forms an image, a display unit that is arranged in front of an eye and displays the image, and a light-guiding unit that connects the image formation unit and the display unit. In general, in the light-guiding unit, incident light is guided by repeating total reflection inside the light-guiding unit. Thus, when reduction in size and reduction in thickness are to be achieved in the display device, a light advance direction is required to be changed largely in order to guide light from the image formation unit to the light-guiding unit. The same holds true in a case where light from the light-guiding unit is guided to the display unit. For this purpose, a diffraction optical element (also referred to as a holographic optical element) is used.

The diffraction optical element deflects light in a direction satisfying a Bragg condition. Thus, when an angle of an incident light differs, deviation is caused to a main wavelength of light reflected in a specific direction. As a result, color unevenness is caused on a plane of the display unit. In view of this, a technique of suppressing color unevenness on the plane by taking the following measure is proposed. That is, a white color is displayed on the display unit, and color unevenness on the plane is observed. For example, an R component is suppressed in a part displayed in a reddish color (for example, see JP-A-2005-241825).

However, the diffraction optical element has a different mode of change of diffraction efficiency for each wavelength of incident light. Thus, even when color unevenness in a case of displaying a white color is suppressed, color unevenness is disadvantageously caused at the time of displaying other colors.

SUMMARY

The present disclosure contains a display device in the following aspect. The display device includes a correction unit configured to correct a chromaticity range of a color original image, an image formation unit configured to form an image with the chromaticity range that is corrected and emit the image as image light, an optical system configured to guide the image light to a display position, and a first diffraction optical element configured to deflect a traveling direction of the image light toward an observer in the optical system, wherein the image light entering the first diffraction optical element includes a light entering at a first angle and a light entering at a second angle that is larger than the first angle, the correction unit limits a chromaticity range of the image of the color original image at a position corresponding to the light entering at the first angle to be close to a chromaticity range of the light entering at the second angle.

DESCRIPTION OF EXEMPLARY EMBODIMENTS

A. First Exemplary Embodiment

Figure 1:
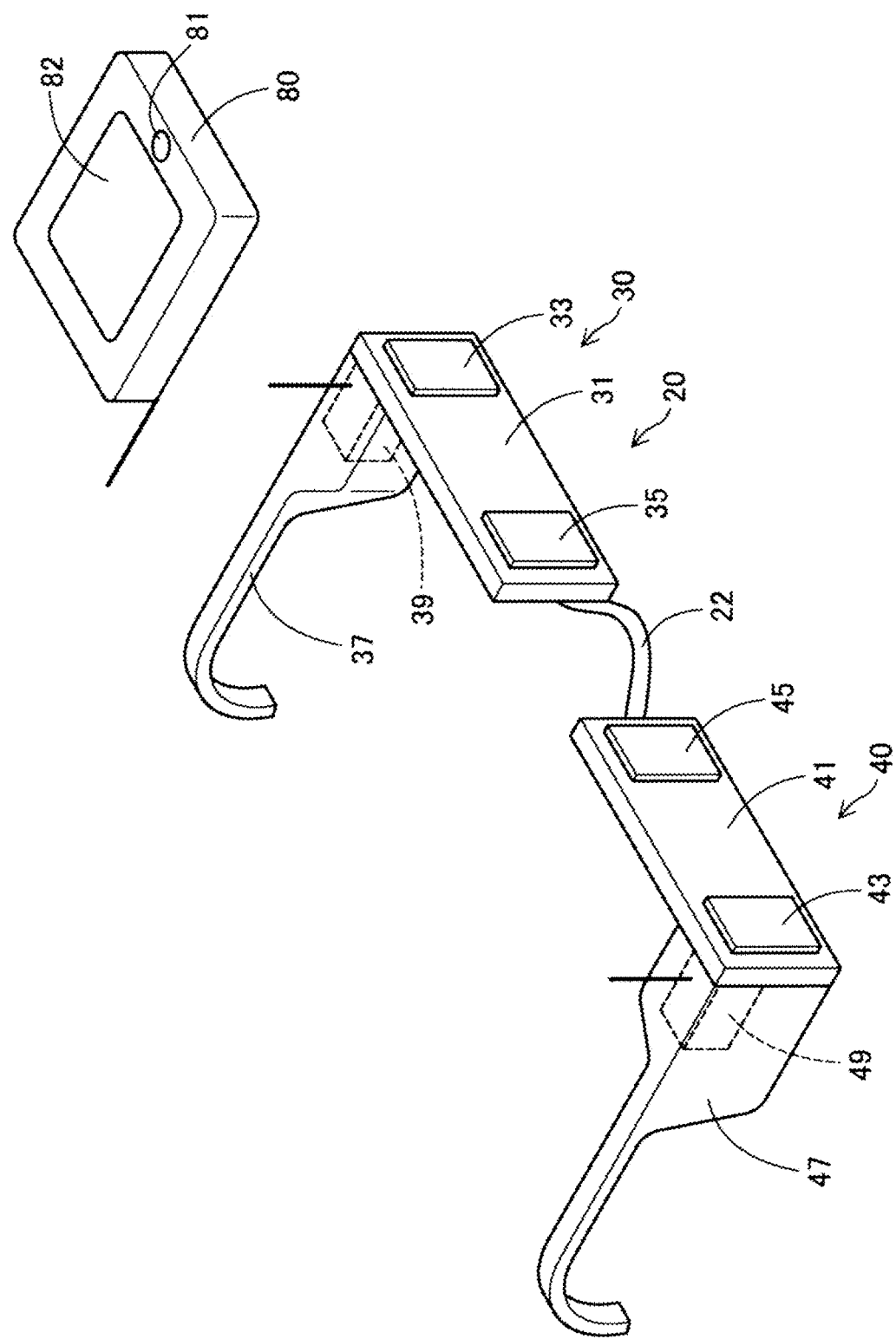
FIG. 1 is a perspective view illustrating an external appearance of a display device according to a first exemplary embodiment.

FIG. 1 is a perspective view of a display device 20 according to a first exemplary embodiment. As illustrated in FIG. 1, the display device 20 is a so-called eyeglasses type, and is a so-called see-through type that enables a user to visually recognize an outside scene through the display device 20. The display device 20 includes a left-eye display unit 30 and a right-eye display unit 40 that are arranged on a left side and a right side as viewed from a user (hereinafter, referred to as an observer), a bridge 22 that connects both the display units 30 and 40 to each other, a left temple 37 mounted to an end of the left-eye display unit 30, a right temple 47 mounted to an end of the right-eye display unit 40, a left image formation unit 39 incorporated in a thick portion of the thick portion of the left temple 37, a right image formation unit 49 incorporated in a thick portion of the right temple 47, and an image transmission device 80 that wirelessly transmits image data to the left image formation unit 39 and the right image formation unit 49.

The image transmission device 80 is a terminal capable of editing and storing pictures and images, and is achieved as, for example, a smartphone, a tablet, or a dedicated device. The image transmission device 80 includes an activation button 81 for activation and a display 82 obtained by laminating a touch panel on a front surface, and transmits still images such as pictures and moving images, which are stored, to the left and right image formation units 39 and 49 by operating the touch panel. Distal ends of the left and right temples 37 and 47 are curved downward as tip cells, and are used for mounting the display device 20 on ears of a user.

Figure 2:
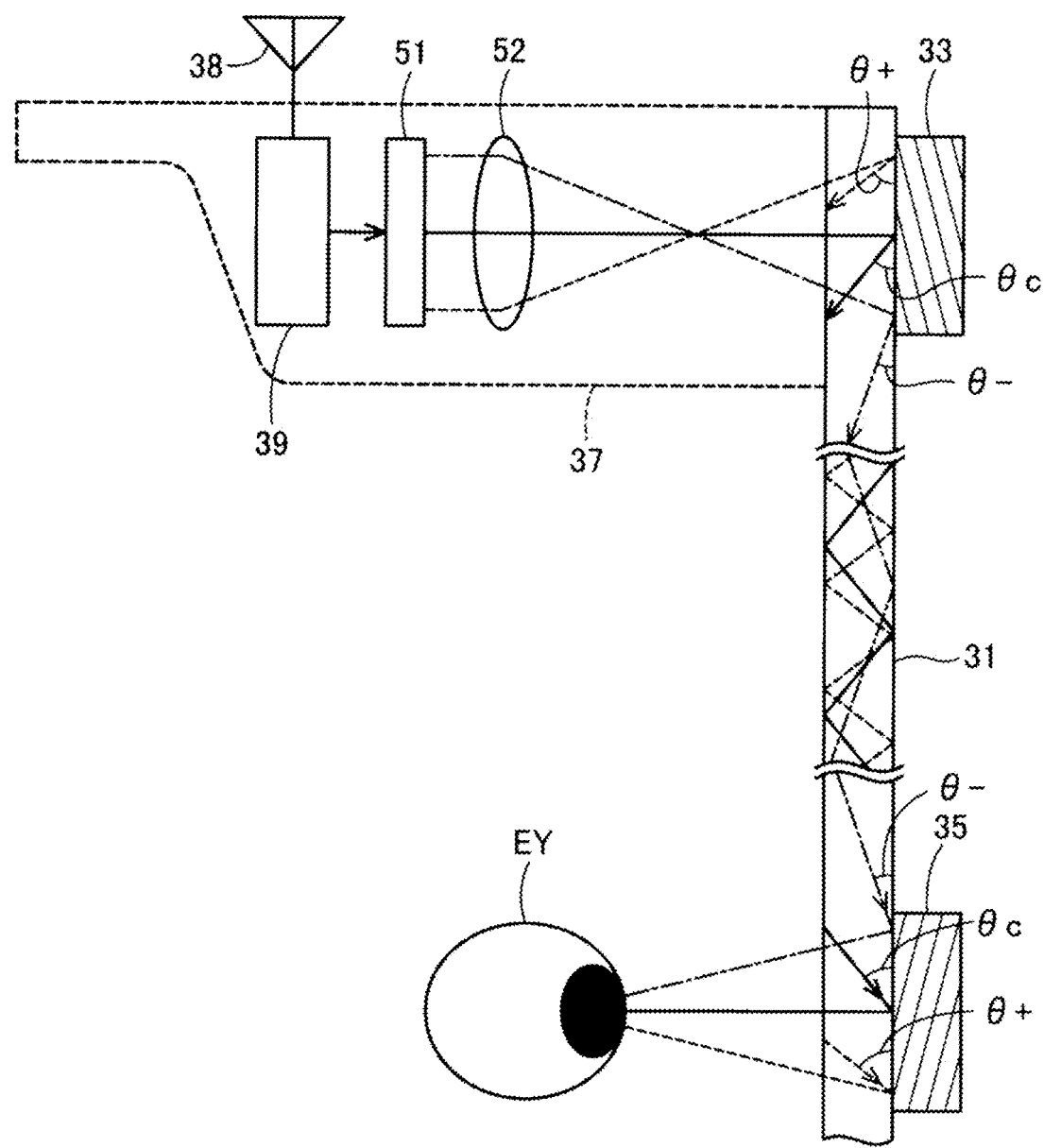
FIG. 2 is an explanatory view schematically illustrating a configuration of a left-eye display unit.

The left-eye display unit 30 and the right-eye display unit 40 have the same configuration except that the respective components are arranged in a left-right symmetrical manner. Thus, hereinafter, the left-eye display unit 30 is given as an example for describing a configuration of the display unit, and configurations and functions of the respective components are the same as those in the right-eye display unit 40. FIG. 2 is an explanatory view schematically illustrating the configuration of the left-eye display unit 30. As in the illustrated example, when receiving transmission of an image from the image transmission device 80 via an antenna 38, the image formation unit 39 incorporated in the left temple 37 forms the received image on an EL display 51. The EL display 51 is a display on which fine elements emitting light of three primary colors including RGB are arrayed. The image formed on the EL display 51 is emitted as image light from the EL display, is paralleled by a collimate lens 52, and enters the left-eye display unit 30. Note that, in place of the EL display 51, a combination of a backlight functioning as a light source and an LCD, a display on which fine LEDs are arrayed, or a combination of laser diodes and an MMD may be adopted. Hereinafter, the EL display 51 is also simply referred to as a display 51. The image formed on the display 51 may be a still image and a moving image. Further, the image may be a full color image using three primary colors (RGB), and may be a limited color image using two primary colors (for example, R and G).

In the present exemplary embodiment, light-guiding bodies 31 and 41 forming an optical system are arranged to guide light in a direction in which both eyes of an observer are arrayed, as illustrated in FIG. 1. Description is made on names of directions in the present specification including other exemplary embodiments. When a user stands upright and wears the display device 20, a gravitational direction is referred to as a downward direction, and a direction opposite to the gravitational direction is referred to as an upward direction. A direction with respect to a head is referred to as a vertical direction. Further, a direction, which is substantially orthogonal to the vertical direction and is an arrangement direction of both eyes, is referred to as a horizontal direction. In the first exemplary embodiment, the left-eye display unit 30 and the right-eye display unit 40 are arrayed along the horizontal direction. Meanwhile, with respect to the light-guiding bodies 31 and 41, a direction in which light is guided inside the light-guiding bodies (generally, a longitudinal direction of the light-guiding bodies 31 and 41) is referred to as a light-guiding direction. On a plane on which an incident diffraction optical element 33 and an emission diffraction optical element 35 of the light-guiding bodies 31 and 41 are provided, a direction orthogonal to the light-guiding direction is referred to as a width direction. In the first exemplary embodiment, the horizontal direction matches with the light-guiding direction, and the vertical direction matches with the width direction.

The left-eye display unit 30 includes the incident diffraction optical element 33 and the emission diffraction optical element 35 in the vicinities of both ends of the light-guiding body 31 on a surface opposite to a surface that light enters the EL display 51. In the present exemplary embodiment, each of the incident diffraction optical element 33 and the emission diffraction optical element 35 is a reflective volumetric hologram having a pattern for causing light diffraction (also referred to as a reflective volumetric holographic element), and an integrated hologram formed integrally with interference patterns corresponding to the respective colors of RGB being the three primary colors is adopted. Therefore, the incident diffraction optical element 33 and the emission diffraction optical element 35 include RGB interference patterns, and light of each color is diffracted by the corresponding interference pattern. However, for convenience of description, description is simply made with a case in which each color of RGB is diffracted by the incident diffraction optical element 33 and the emission diffraction optical element 35.

B. With Regard to Color Unevenness Caused in Image

Description is made on a case where color unevenness is caused when such diffraction optical elements are used to display an image. In FIG. 2, for convenience, a difference in position at which the image light from the display 51 enters the incident diffraction optical element 33 and a difference in position of the image light emitted from the emission diffraction optical element 35, particularly, a difference in position in the light-guiding direction is indicated as a difference in angle of view θ. The incident light from the display 51 through the collimate lens 52 has a traveling direction largely deflected by the incident diffraction optical element 33, advances in the light-guiding body 31 while being totally reflected on a boundary surface of the light-guiding body 31, has a traveling direction largely deflected by the emission diffraction optical element 35, and is emitted in a direction to an eye EY of an observer who wears the display device 20. With regard to the angles of the emitted image light, with respect to an angle of view θc of light emitted in a normal line direction from the center part of the emission diffraction optical element 35, an angle of image light entering an end of the emission diffraction optical element 35, which is an end farthest from the incident diffraction optical element 33, is indicated with θ+, and an angle of image light entering an opposite end is indicated with θ−. Similarly, with regard to the incident diffraction optical element 33, with respect to an angle of view θc of image light entering the incident diffraction optical element 33 from the center of the display 51, an angle of image light entering an end of the incident diffraction optical element 33, which is an end farthest from the emission diffraction optical element 35, is indicated with θ+, and an angle of image light entering an opposite end is indicated with θ−.

The diffraction optical element adopted as each of the incident diffraction optical element 33 and the emission diffraction optical element 35 is a reflective volumetric hologram, and has interference patterns as patterns for diffraction. The interference patterns have a structure obtained by alternately laminating planar layers having different refractive indexes in a predetermined direction (pitch direction). When an interval between the interference patterns in the predetermined direction is indicated with a pitch d, and a wavelength of incident light is indicated with λ, the incident light is diffracted in an angle direction α satisfying Expression (1) given below.

$$d \cdot \sin \alpha = m \cdot \lambda \qquad (1)$$

Note that, in Expression (1), m is a degree. In general, diffraction light in a direction satisfying m=1 is dominant. The patterns being the interference patterns and the like formed on the incident diffraction optical element 33 and the emission diffraction optical element 35 are intended to deflect light. Thus, the pitch direction of the patterns is inclined in the light-guiding direction with respect to the traveling direction of the incident light, and is inclined with respect to a surface that the incident light enters. Therefore, on the surface of the reflective volumetric hologram that the incident light enters, the patterns being the interference patterns and the like extending in the direction intersecting the light-guiding direction are arranged in the light-guiding direction at a pitch different from the pitch d. In the present exemplary embodiment, the emission diffraction optical element 35 corresponds to a first diffraction optical element, and the incident diffraction optical element 33 corresponds to a second diffraction optical element.

Figure 3:
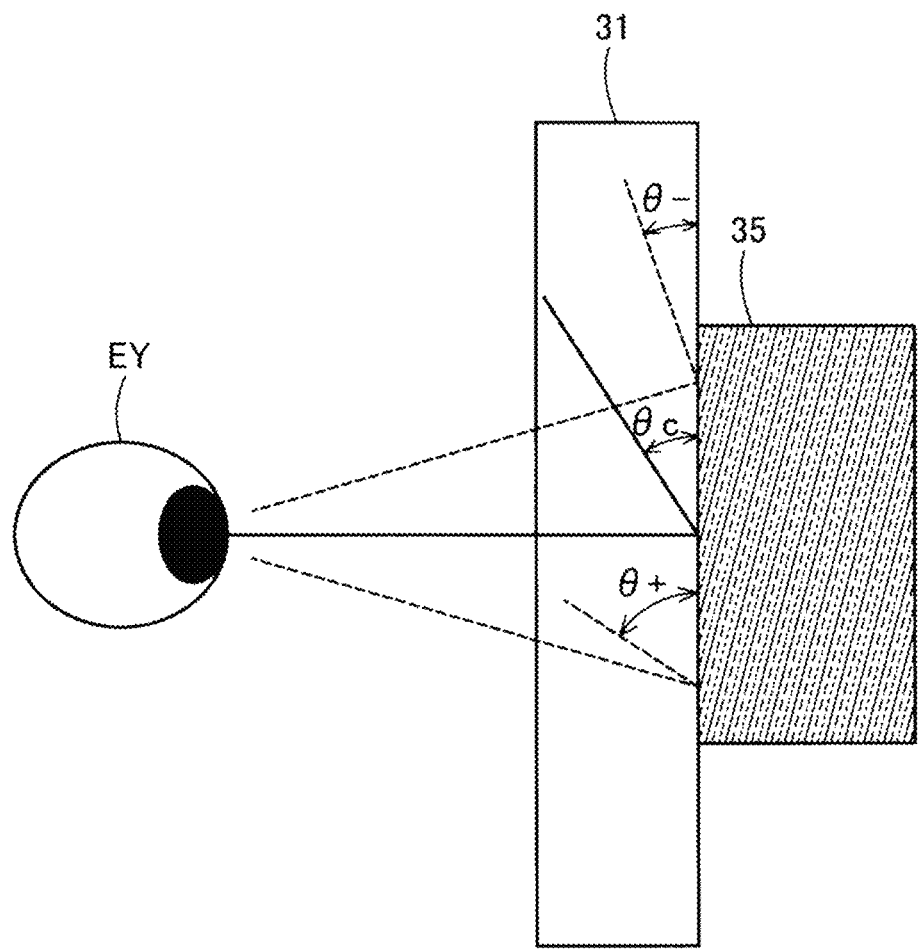
FIG. 3 is an explanatory view illustrating a diffraction optical element and incident angles on a light-guiding body.

In the incident diffraction optical element 33 and the emission diffraction optical element 35, the angle of incident light differs depending on positions in the light-guiding direction. The difference in angle is illustrated in FIG. 3. FIG. 3 illustrates the emission diffraction optical element 35. With regard to the light reaching the emission diffraction optical element 35 from the incident diffraction optical element 33 while repeating total reflection inside the light-guiding body 31, image light, which is diffracted at a position of the emission diffraction optical element 35 on a side closest to the incident diffraction optical element 33 and reaches the eye EY of an observer, and image light, which is diffracted at a position of the emission diffraction optical element 35 on a side farthest from incident diffraction optical element 33 and reaches the eye EY of an observer, have different diffraction angles. This difference is illustrated as a difference in angle of view of the image light entering the incident diffraction optical element 33 from the display 51 and an angle of view of the image light entering the eye EY from the emission diffraction optical element 35 in FIG. 2, and is illustrated as a difference in incident angle of each image light in FIG. 3. Both the drawings are essentially the same in illustrating a difference in angle α in Expression (1) given above. In FIG. 3, an incident angle of the image light diffracted at the position of the emission diffraction optical element 35 on the side closest to the incident diffraction optical element 33 is indicated with θ−, an incident angle of the image light diffracted at the position of the emission diffraction optical element 35 on the side closest to the light-guiding body 31 is indicated with θ+, and an incident angle of the image light diffracted at the middle position of the emission diffraction optical element 35 between the two positions described above is indicated with θc. A property of the emission diffraction optical element 35, that is, a relationship between a wavelength and a diffraction angle satisfying Expression (1) is designed by the incident angle θc of the image light at the middle position. The incident angles θ− and θ+ in FIG. 3 is regarded as a deviation from the incident angle θc of the image light at the middle position.

When the position at which the image light enters the emission diffraction optical element 35 in the light-guiding direction differs, the incident angle differs. Here, it is assumed that a property of the emission diffraction optical element 35 is designed so as to satisfy Expression (1) given above with respect to a predetermined color (reference wavelength λ) at the incident angle θc at the middle position of the emission diffraction optical element 35 in the light-guiding direction. In this case, at the incident angles θ− and θ+ at the positions of both the ends of the emission diffraction optical element 35, Expression (1) is not necessarily satisfied. When the image light entering both the ends of the emission diffraction optical element 35 at the incident angles θ− and θ+ satisfies Expression (1), the wavelength of the image light is different from the wavelength at the middle position satisfying Expression (1).

Figure 4:
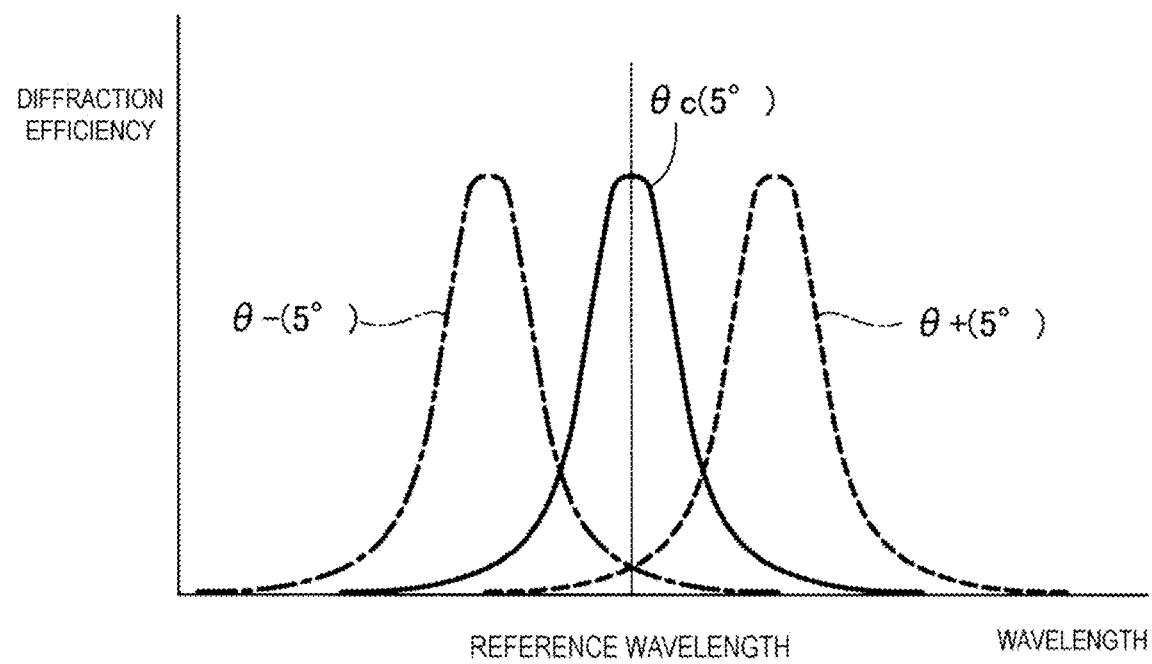
FIG. 4 is an explanatory view illustrating a relationship between a wavelength and diffraction efficiency of the diffraction optical element.

This state is exemplified in FIG. 4. FIG. 4 illustrates a degree at which the wavelength satisfying Expression (1) is shifted when the incident angle is increased or reduced by 5° with respect to the incident angle θc at the middle position of the emission diffraction optical element 35. It is assumed that the image light having a wavelength falling within the same range and equal intensity enters the emission diffraction optical element 35. In this case, as the incident angle is increased or reduced from the angle satisfying Expression (1), diffraction efficiency is degraded, and intensity of diffracted light is lowered. FIG. 4 illustrates a case where the incident angle is increased and reduced by 5° with respect to the incident angle θc at the middle position of the emission diffraction optical element 35. When the incident angle is increased and reduced by a smaller amount, that is, at a position closer to the middle position, deviation in wavelength with peak diffraction efficiency is small, and reduction in diffraction efficiency of the image light having a wavelength falling within the same range is small. In contrast, with respect to the incident angle θc at the middle position of the emission diffraction optical element 35, when the incident angle is increased and reduced by a larger amount, that is, at a position farther from the middle position, deviation in wavelength with peak diffraction efficiency is large, and reduction in diffraction efficiency of the image light having a wavelength falling within the same range is large. The incident angle θc is the incident angle of the image light at the middle position, and hence is also referred to a reference angle of view θc hereinafter. At the time of referring to a deviation with respect to the reference angle of view θc, the incident angle of the image light θ−, which is an incident angle smaller than the reference angle of view θc at the emission diffraction optical element 35, is also referred to as a negative angle of view θ− because the deviation with respect to the center angle of view θc is a negative value. The incident angle of the image light θ+ being a large incident angle is also referred to as a positive angle of view θ+.

Figure 5:
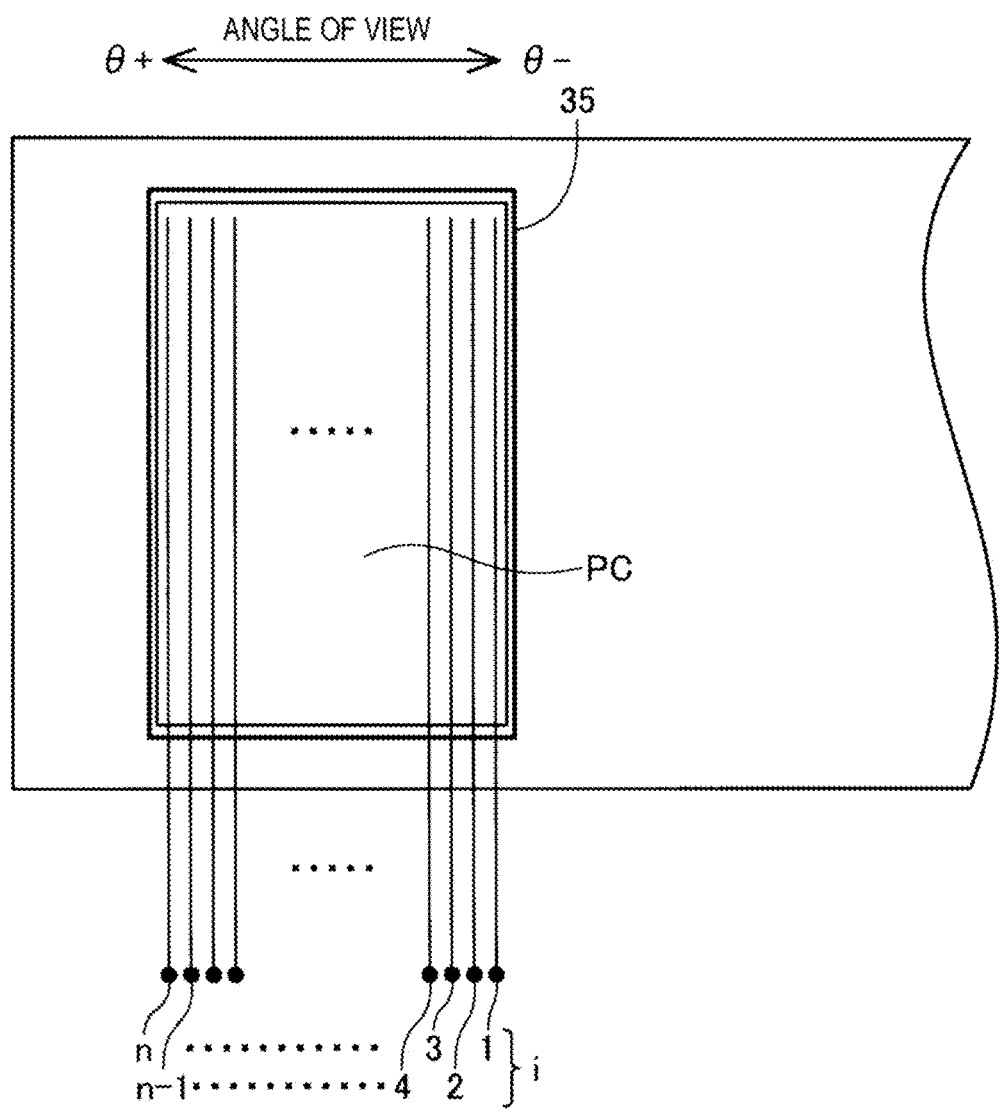
FIG. 5 is an explanatory view illustrating positions on an emission diffraction optical element.

The image formed on the display 51 is guided to the emission diffraction optical element 35 from the incident diffraction optical element 33 through the light-guiding body 31, and is formed as an image on the emission diffraction optical element 35 as viewed by an observer. Therefore, as viewed by an observer, a difference in angle of the image light with respect to the emission diffraction optical element 35 is equivalent to a difference in position on the emission diffraction optical element 35. In view of this, as illustrated in FIG. 5, a range in which an image is formed on the emission diffraction optical element 35 is indicated with a reference symbol PC, and a position in the range PC in the light-guiding direction is referred to as a position i. Further, a position at which an absolute value of the negative angle of view θ− is maximum is indicated with a position 1, and a position at which a value of the positive angle of view θ+ is maximum is indicated with a position n. When diffraction efficiency at the reference angle of view θc is at its peak with respect to image light having a wavelength λ falling within a certain range, diffraction efficiency is degraded as the position i that the image light enters has an angle closer to the position 1 or the position n. Diffraction efficiency at a certain position i (i=1 to n) is referred to as diffraction efficiency Si at the position i.

As described above, the diffraction efficiency Si of the emission diffraction optical element 35 differs depending on the position i. Thus, when image light having a wavelength falling within a certain range enters the emission diffraction optical element 35, the diffraction efficiency Si differs in accordance with the incident angle θ corresponding to the position. As illustrated in FIG. 4, the pitch and the like of the interference patterns of the emission diffraction optical element 35 are adjusted so that diffraction efficiency is maximum at the reference angle of view θc. Thus, at the negative angle of view θ− and the positive angle of view θ+, diffraction efficiency of the image light having a diffracted wavelength (reference wavelength) is degraded. As understood from Expression (1) given above, the wavelength λ with maximum diffraction efficiency is shifted to a small wavelength side and a large wavelength side as approaching to the ends in the light-guiding direction from the image formation range PC illustrated in FIG. 5. Degradation of diffraction efficiency and a shift of the wavelength with the maximum efficiency is increased as the angle of view is deviated from the reference angle of view θc. Note that such degradation of the diffraction efficiency Si and a shift of the wavelength λ with the maximum diffraction efficiency are caused in the light-guiding direction, that is, the pitch direction of stripes of the interference patterns with respect to the emission diffraction optical element 35, and are not caused in the orthogonal direction, that is, a direction of the stripes of the interference patterns. A degree of such degradation of the diffraction efficiency Si differs for each wavelength λ. When a color image is displayed, color unevenness due to variation of the diffraction efficiency Si is caused.

C: Configuration for Suppressing Unevenness

Figure 6:
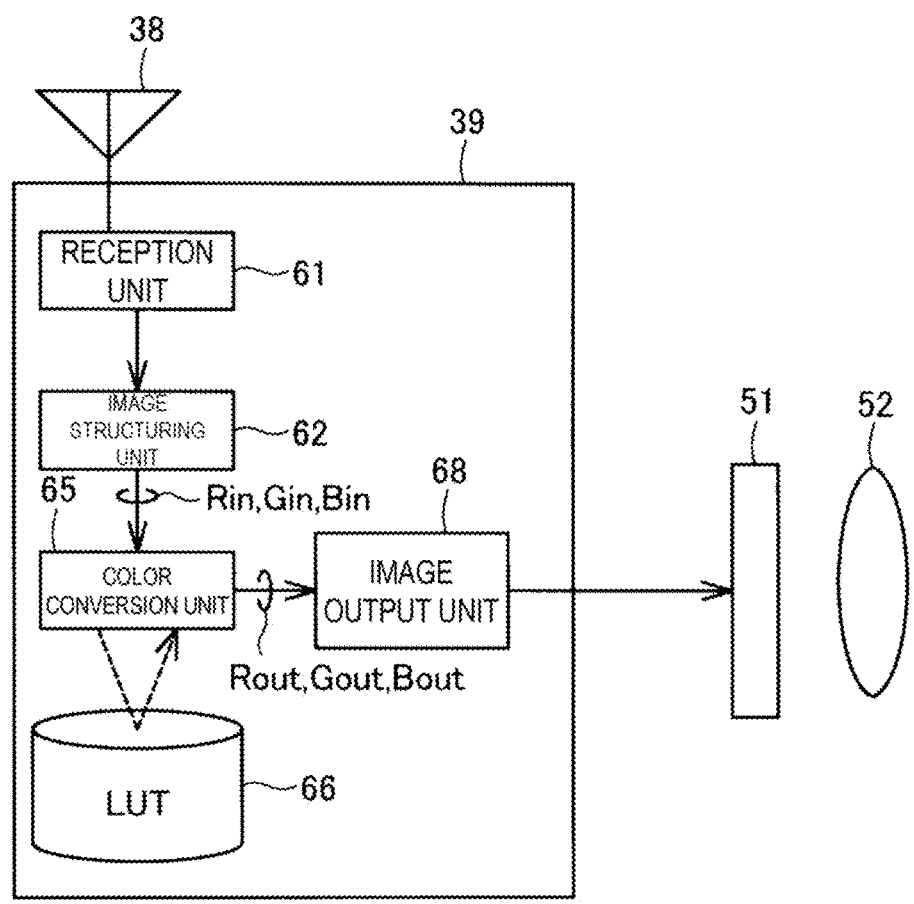
FIG. 6 is a block diagram illustrating an internal configuration of an image formation unit.

The display device 20 according to the present exemplary embodiment includes a color conversion unit 65 inside the image formation unit 39 as a correction unit for suppressing color unevenness. As illustrated in FIG. 6, the image formation unit 39 includes a reception unit 61 that receives wireless signals from the image transmission device 80 via the antenna 38, an image structuring unit 62 that structures a transmitted image from the received signals, the color conversion unit 65 that performs color conversion by inputting input signals (Rin, Gin, Bin) from the image structuring unit 62, an image output unit 68 that inputs output signals (Rout, Gout, Bout) after conversion, which are output from the color conversion unit 65, and outputs display signals to the display 51, and a storage unit 66 that stores look-up tables (LUTs) to which the color conversion unit 65 refers at the time of color conversion.

Figure 7:
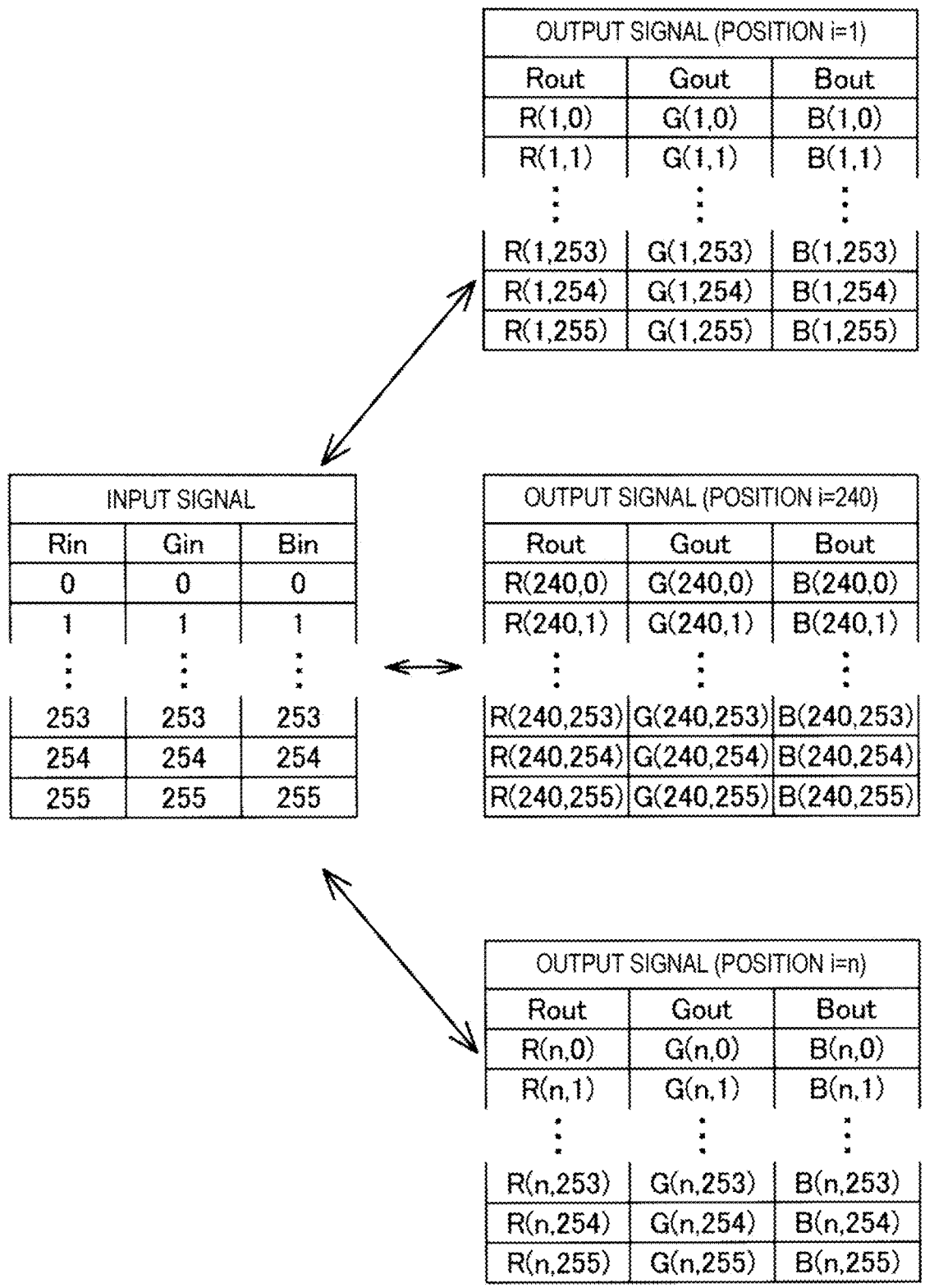
FIG. 7 is an explanatory view illustrating a configuration of LUTs.
Figure 8A:
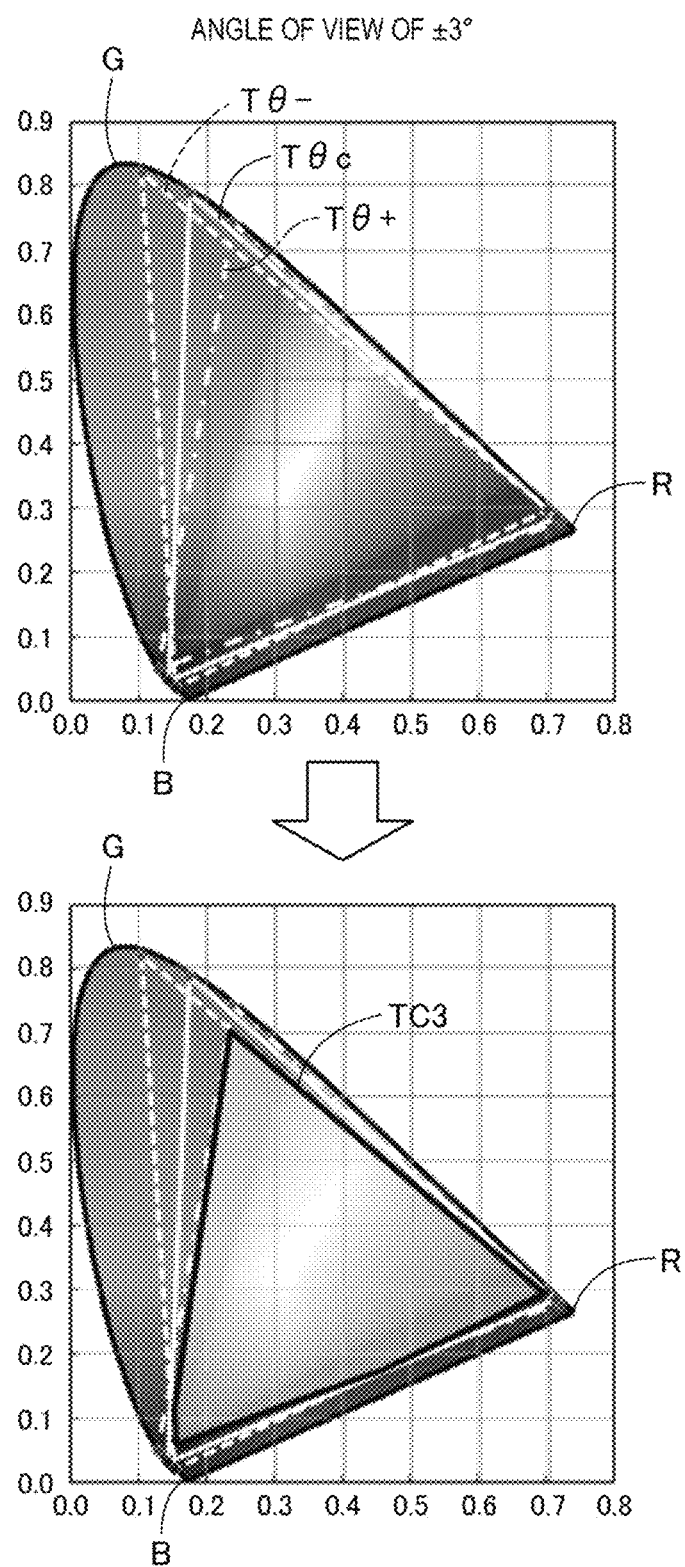
FIG. 8A is an explanatory view illustrating a displayable chromaticity range in a case of an angle of view of ±3°.
Figure 8B:
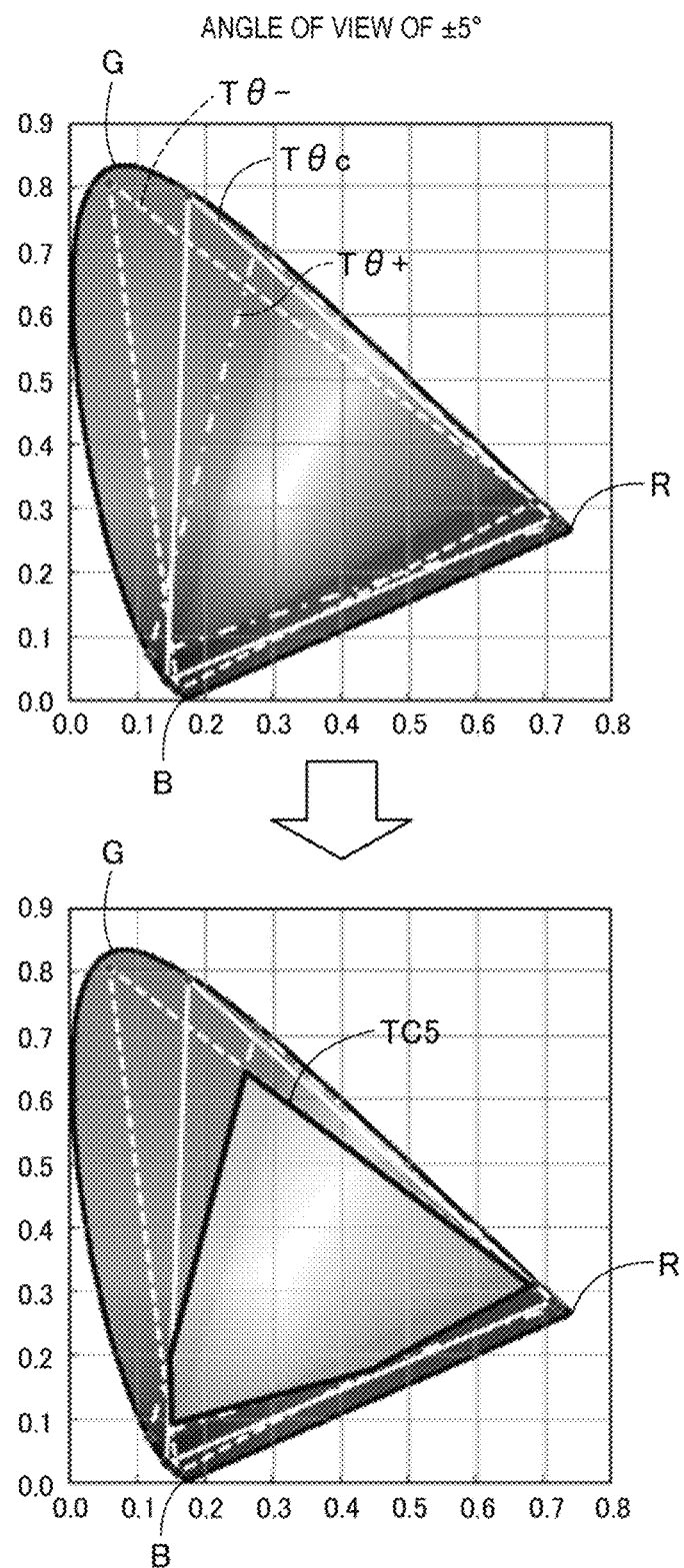
FIG. 8B is an explanatory view illustrating a displayable chromaticity range in a case of an angle of view of ±5°.
Figure 8C:
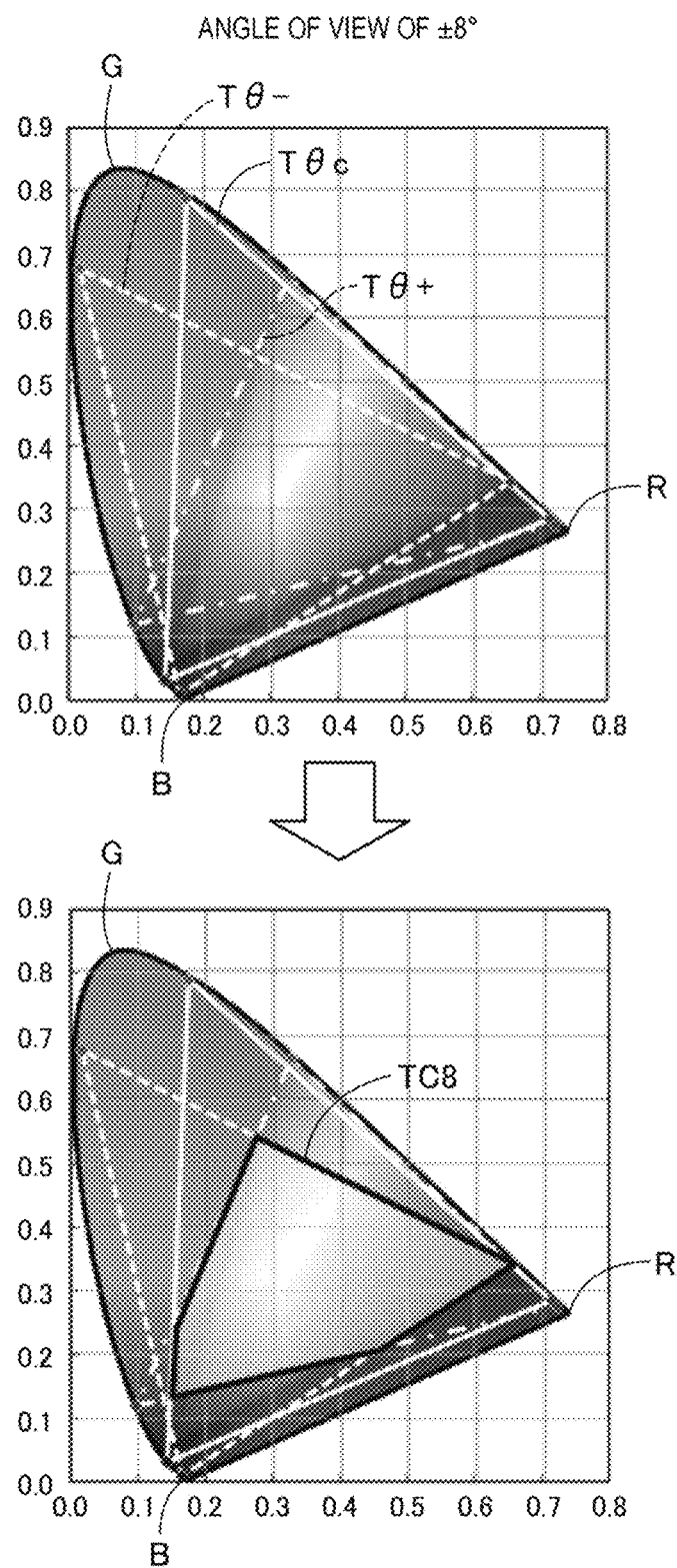
FIG. 8C is an explanatory view illustrating a displayable chromaticity range in a case of an angle of view of ±8°.
Figure 8D:
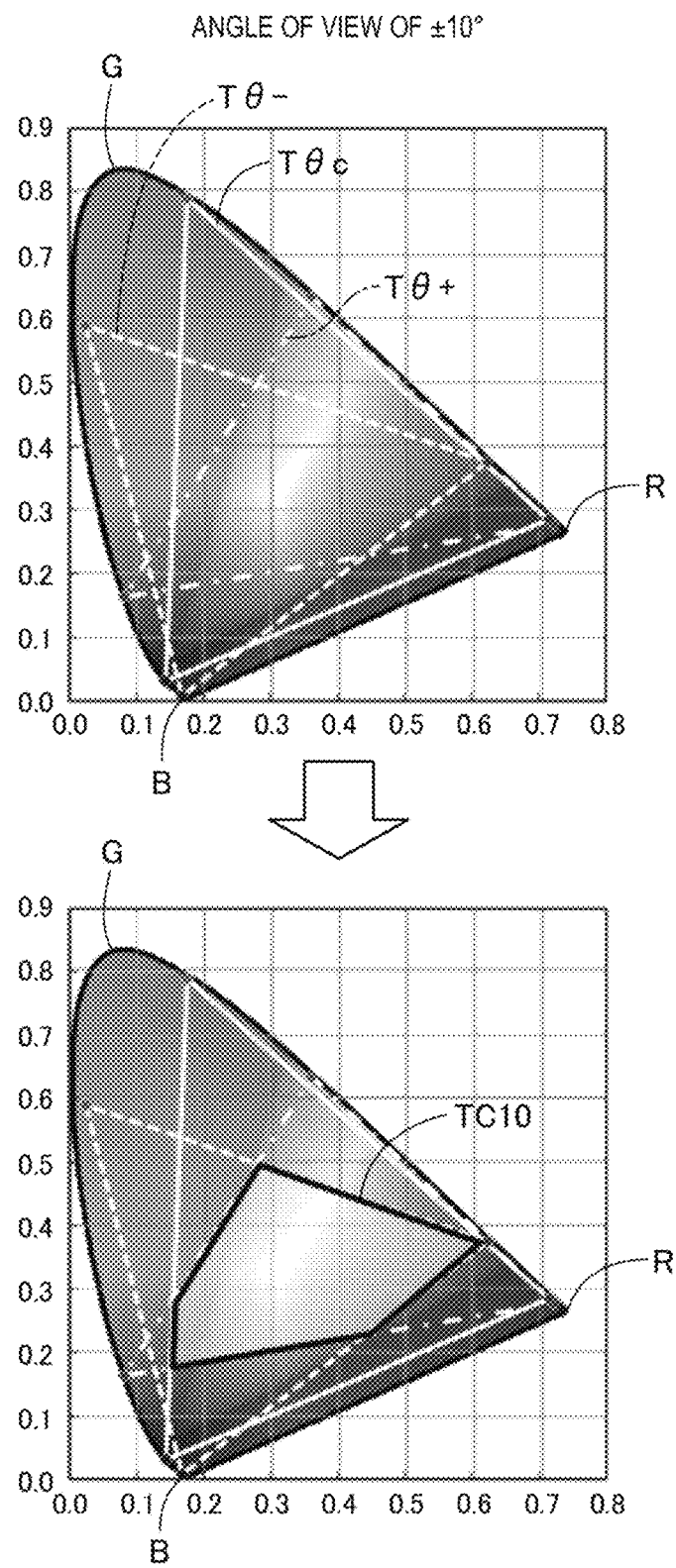
FIG. 8D is an explanatory view illustrating a displayable chromaticity range in a case of an angle of view of ±10°.

By referring to the LUTs stored in the storage unit 66, based on the input signals (Rin, Gin, Bin) input from the image structuring unit 62, the color conversion unit 65 of the image formation unit 39 generates the output signals (Rout, Gout, Bout) that prevent color evenness from being caused due to the incident position of the image light on the emission diffraction optical element 35. This state is illustrated in FIG. 7. In the present exemplary embodiment, the input signals (Rin, Gin, Bin) are eight-bit signals for the respective colors. Thus, as illustrated in FIG. 7, each of Rin, Gin, and Bin takes a value from gradation values 0 to 255.

As illustrated in the right column in FIG. 7, the LUT is prepared for each position i illustrated in FIG. 5. FIG. 7 illustrates a case of i=0, a case of i=240, and a case of i=n. However, the LUTs corresponding to i=0 to n are prepared in advance. Alternatively, instead of preparing the LUTs for all the positions i, only the LUTs for values i at intervals may be prepared, and the output signals Rout, Gout, and Bout between the intervals for the respective colors may be obtained by interpolation.

As in the illustrated examples in FIG. 8A to FIG. 8D, in view of that a range of each of the colors RGB that can be expressed differs in accordance with an angle of view, the LUTs are formed so as to suppress a difference between the ranges that can be expressed for each angle of view. Description is made by giving the respective drawings as examples. FIG. 8A to FIG. 8D are explanatory diagrams illustrating a chromaticity range with an XY chromaticity coordinate in an XYZ color system. In the drawings, a reference symbol R indicates that an apex is red (R=255, G=B=0), a reference symbol G indicates that an apex is green (G=255, R=B=0), and a reference symbol B indicates that an apex is blue (B=255, R=G=0). In each figure, a white solid line Tθc indicates a chromaticity range that can be expressed at the center angle of view θc, a white broken line Tθ− indicates a chromaticity range that can be expressed at the negative angle of view θ−, and a white one-dotted chain line Tθ+ indicates a chromaticity range that can be expressed at the positive angle of view θ+.

In upper parts of FIG. 8A to FIG. 8D, the chromaticity ranges at ranges of angles of view of ±3°, ±5°, ±8°, and ±10° are illustrated. As in the illustrated example, in any of the ranges of an angle of view, the chromaticity range that can be expressed at the negative angle of view θ− (the white broken line Tθ−) and the chromaticity range that can be expressed at the positive angle of view θ+ (the white one-dotted chain line Tθ+) are twisted in a substantially reciprocated shape with respect to the chromaticity range that can be expressed at the positive angle of view θc (the white solid line Tθc). The chromaticity range that can be expressed at the negative angle of view θ− (the white broken line Tθ−) corresponds to a chromaticity range at a small angle of view, the chromaticity range that can be expressed at the positive angle of view θ+ (the white one-dotted chain line Tθ+) corresponds to a chromaticity range at a large angle of view, and the chromaticity range that can be expressed at the positive angle of view θc (the white solid line Tθc) corresponds to a chromaticity range at a center angle of view. Here, the chromaticity range at a small angle of view is larger than the center chromaticity range, and the center chromaticity range is larger than the chromaticity range at a large angle of view. In lower parts of FIG. 8A to FIG. 8D, a common range being a range in which those three chromaticity ranges overlap with one another is indicated with black solid lines TC3, TC5, TC8, and TC10. As in the illustrated example, the common range is substantially reduced as the ranges of angles of view are increased.

In the present exemplary embodiment, in consideration of a difference in common range of the chromaticity ranges due to such difference in angle of view, the RGB values corresponding to the output signals (Rout, Gout, Bout) after conversion are stored in the LUTs illustrated in FIG. 7 in association with the positions i. Therefore, when the image transmitted from the image transmission device 80 is formed on the display 51, the image formation unit 39 inputs the input signals (Rin, Gin, Bin) of the image corresponding to the positions i on the emission diffraction optical element 35. Then, the color conversion unit 65 converts the input signals into the output signals (Rout, Gout, Bout) corresponding to an image in the common range by referring to the LUTs stored in the storage unit 66 in advance. Thus, the emission diffraction optical element 35 has equivalent diffraction efficiency Si for each of the colors RGB, regardless of the positions i. As a result, color unevenness of the image formed in the emission diffraction optical element 35 is suppressed.

In the first exemplary embodiment described above, in the LUTs illustrated in FIG. 7, for example, when a gradation value of each of the colors RGB at the negative angle of view θ− is converted within the common range, a gradation value for each color on the outermost side of the chromaticity range indicated with the white broken line Tθ− is regarded as a gradation value for each color on the outermost side of the common range and on an axis extending to a white balance point. Further, as a gradation value of each color takes a value on an inner side of the chromaticity range indicated with the white broken line Tθ−, the value is gradually compressed by a proportional calculation, and takes a value on an inner side of the common range. Thus, color unevenness due to a difference in positions i of the image is almost solved. Alternatively, instead of converting all the gradation values of each color outside the common range into the values within the common range with the LUTs, the LUTs may be formed that the values are shifted toward the common range. In this manner, color unevenness can be suppressed. Further, instead of preparing the LUTs for all the colors, only a LUT for a part of the colors may be prepared. Note that, instead of automatic proportional distribution that obtains a gradation value of each color on the axis extending to the white balance point as described above, a gradation value of each color after color conversion may be obtained by obtaining a gradation value that suppresses color unevenness while an observer performs visual recognition.

D. Other Exemplary Embodiments

Figure 9:
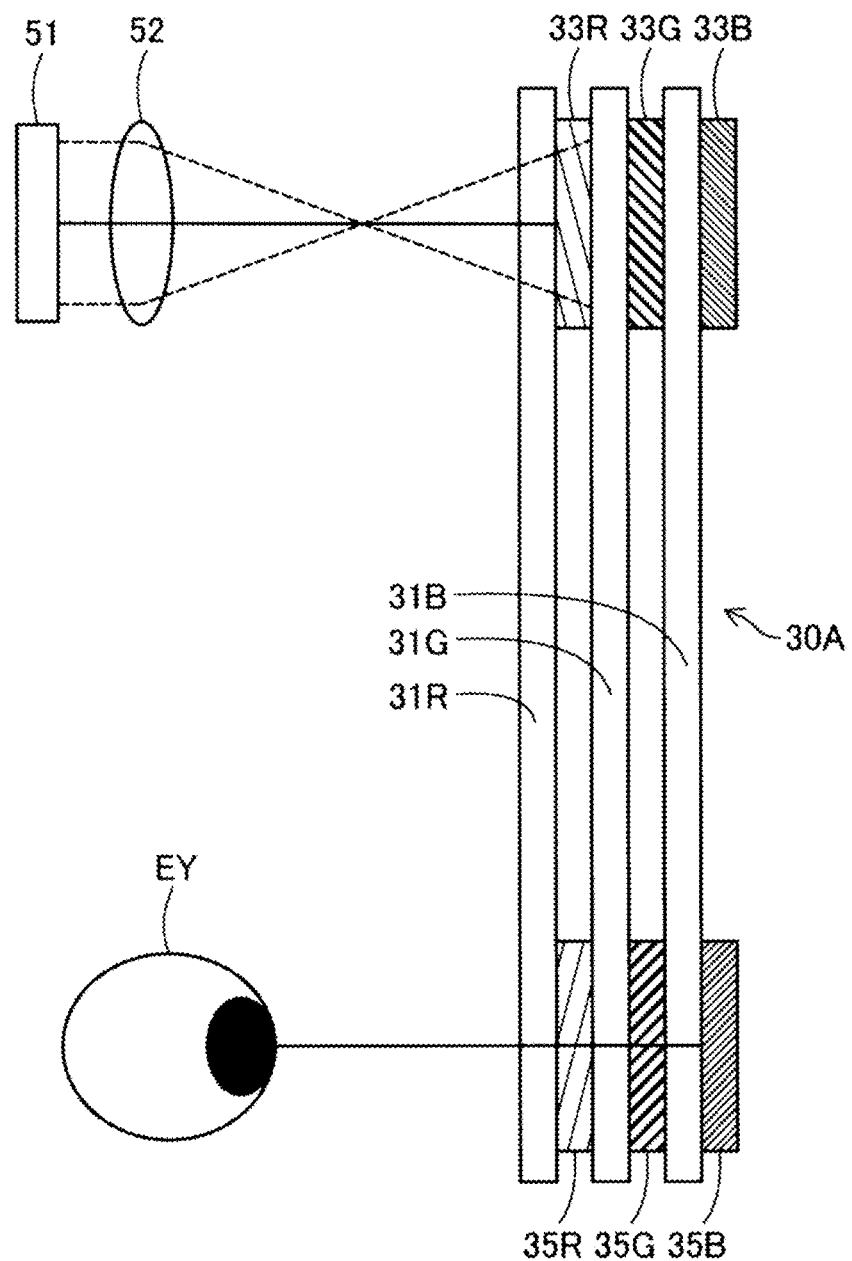
FIG. 9 is an explanatory view schematically illustrating a configuration of a left-eye display unit in other exemplary embodiments.

In the above-mentioned exemplary embodiment, the reflective volumetric hologram on which the interference patterns for each of the colors RGB are integrally formed is adopted, but a diffraction optical element in a different mode may be adopted. FIG. 9 is an explanatory view schematically illustrating a configuration of a left-eye display unit 30A as a configuration example of an optical system adopting a diffraction optical element in a different mode. Note that the right-eye display unit includes a similar configuration.

The left-eye display unit 30A includes the display 51 that forms a full color image, and light-guiding paths that guides image light of red (R) corresponding to a first image light, image light of green (G) corresponding to the second image light, and image light of blue (B) corresponding to the third image light, which are emitted from the display 51, respectively. That is, the display 51 is capable of emitting light of red (R), green (G), and blue (B) per pixel unit, and the left-eye display unit 30A includes three light-guiding paths that separately guides the image light of red (R), green (G), and blue (B). The light-guiding path for red light R is formed of an incident diffraction optical element 33R, a light-guiding body 31R, and an emission diffraction optical element 35R. The light-guiding path for green light G is formed of an incident diffraction optical element 33G, a light-guiding body 31G, and an emission diffraction optical element 35G. The light-guiding path for blue light B is formed of an incident diffraction optical element 33B, a light-guiding body 31B, and an emission diffraction optical element 35B. The left-eye display unit 30A has a configuration of overlapping those three light-guiding paths. Even when the light-guiding paths overlap one another as described above, light other than light having a wavelength that is designed to be diffracted passes through the diffraction optical element. Thus, for example, among the light of the colors RGB, the light of B passes through the incident diffraction optical element 33R for R and the incident diffraction optical element 33G for G that are present on the display 51 side, and reaches the incident diffraction optical element 33B for B. Among the light of the colors RGB, the light of G also passes through the incident diffraction optical element 33R that is present in front.

The left-eye display unit 30A illustrated in FIG. 9 guides the primary three colors RGB from the display 51 to the eye EY of an observer through the three light-guiding paths that are independently prepared correspondingly to the light of the respective colors, and hence is capable of displaying a full color image. Even when such configuration is adopted, actions and effects of the display device 20 as a whole are the same as those in the first exemplary embodiment.

Figure 10:
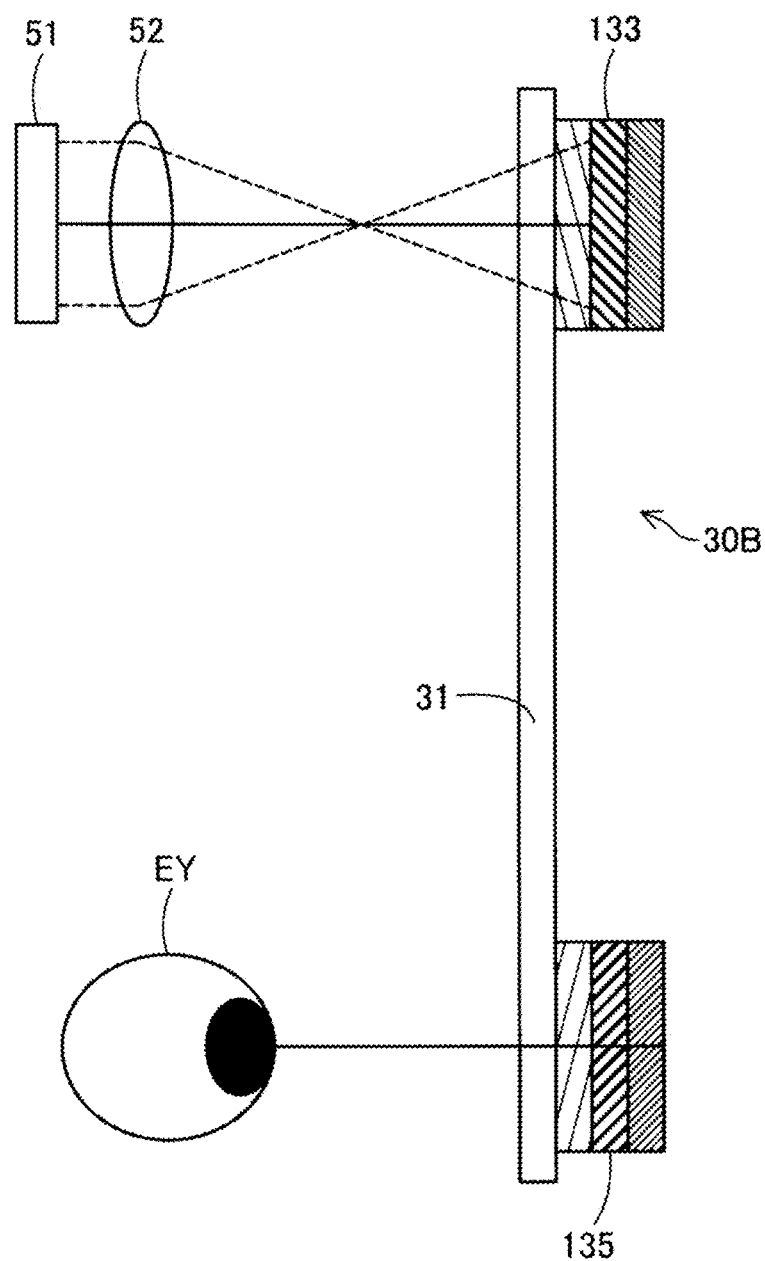
FIG. 10 is an explanatory view schematically illustrating a configuration of a left-eye display unit in other exemplary embodiments.

FIG. 10 is an explanatory view schematically illustrating a configuration of a left-eye display unit 30B including diffraction optical elements and light-guiding bodies in a further different exemplary embodiment. The right-eye display unit includes a similar configuration. The left-eye display unit 30B guides the primary three colors RGB, which forms a full color image on the display 51, to the eye EY of an observer through the same one light-guiding path. Similarly to the first exemplary embodiment, the display 51 is capable of emitting light of red (R), green (G), and blue (B) per pixel unit, and emits the image light of red (R) corresponding to the first image light, the image light of green (G) corresponding to the second image light, and the image light of blue (B) corresponding to the third image light. The left-eye display unit 30B includes, on the one light-guiding body 31, an incident diffraction optical element 133 for the three primary colors RGB and an emission diffraction optical element 135 for the three primary colors RGB. The incident diffraction optical element 133 and the emission diffraction optical element 135 are obtained by laminating or superposing diffraction optical elements for the three primary colors RGB. However, light other than light having a wavelength that is designed to be diffracted passes through the diffraction optical element, and hence the light of the respective colors arrives at the positions of the corresponding diffraction optical elements.

The left-eye display unit 30B illustrated in FIG. 10 guides the three primary colors RGB from the display 51 to the eye EY of an observer through the one light-guiding body 31 prepared for the light of the respective colors in a collective manner. Thus, the device configuration can be reduced in thickness. Moreover, a full color image can be displayed. Note that other actions and effects of the display device 20 as a whole are the same as those in the first exemplary embodiment.

Figure 11:
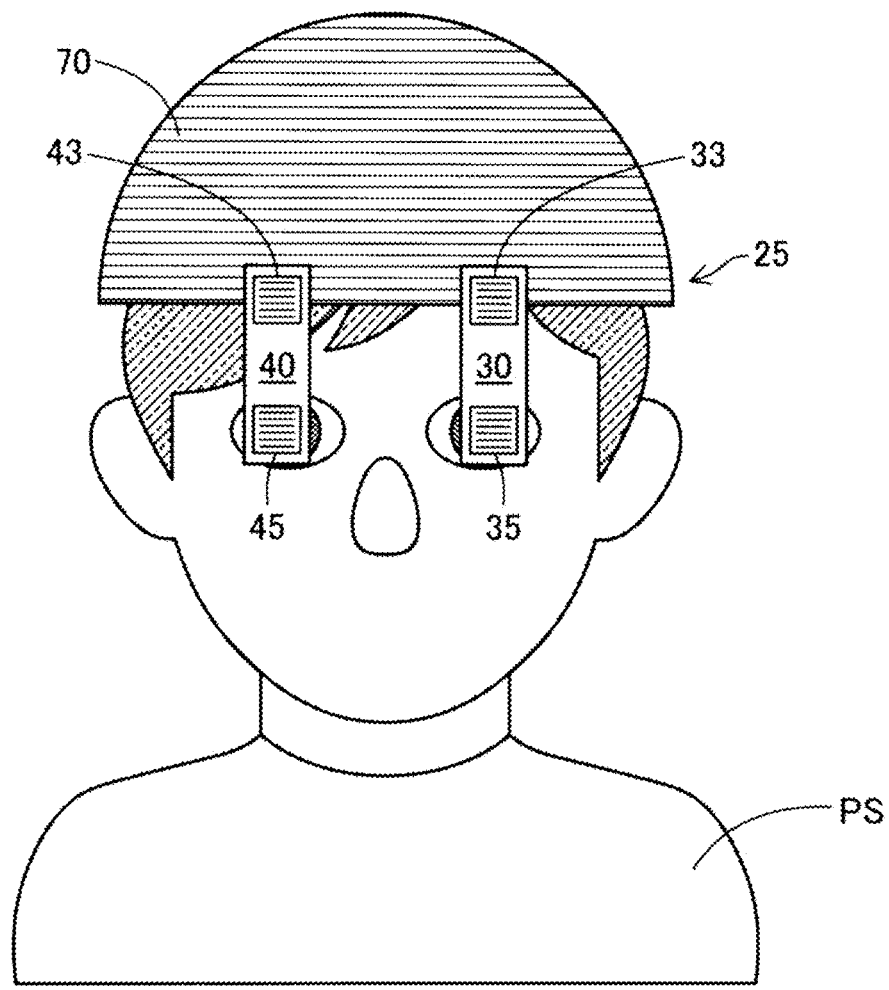
FIG. 11 is an explanatory view illustrating arrangement of an optical system in other exemplary embodiments.

In each of the above-mentioned exemplary embodiments, the display device 20 is an eyeglass type, and guides the image light in front of the eye EY from a head of an observer in the horizontal direction. However, as illustrated in FIG. 11, the image light may be guided in the vertical direction. As in the illustrated example, a display device 25 in this aspect includes a head-mounted tool 70 mounted on a head of an observer PS, and has a configuration in which the left-eye display unit 30 and the right-eye display unit 40 are provided in the vertical direction from the head-mounted tool 70. The left-eye display unit 30 and the right-eye display unit 40 include similar configurations as in the first exemplary embodiment.

In addition to the left-eye display unit 30 and the right-eye display unit 40, the head-mounted tool 70 is provided with the image formation units each including a similar configuration as in the first exemplary embodiment (see FIG. 2). The image formed on the display 51 enters the incident diffraction optical elements 33 and 43 of the left-eye display unit 30 and the right-eye display unit 40, and is guided to the emission diffraction optical elements 35 and 45 through the light-guiding bodies 31 and 41.

In the above-mentioned exemplary embodiment, each of the display devices 20 and 25 is a see-through type enabling an outside scene to be visually recognized, but is not necessarily required to be limited to a see-through type. Further, the present disclosure is not required to be limited to a binocular type, and may be provided as a monocular-type display device. The image formed on the display 51 is not limited to have an aspect ratio of 16:9, and may have other aspect ratios such as a ratio of 4:3. Further, the displayed image is not limited to a rectangular shape in a mathematical sense, and may be formed in various shapes such as a square and an oval. In any shapes, it is only required to obtain a chromaticity range to be expressed and prepare a LUT in accordance with this. Further, the shape of the display 51 itself and the shape of the image to be displayed may be different from each other.

In the above-mentioned exemplary embodiment, the diffraction optical element is prepared for each of the three primary colors RGB. However, the present disclosure is not limited to the three primary colors. For example, a combination of two colors such as RG, GB, and RB may be adopted. For example, a combination such as R/GB, RG/B, and G/RB may be adopted. Further, the present disclosure is not limited to RGB, and a display device may be configured with a combination of different colors such as Y, C, and M.

The diffraction optical element is not required to be limited to a reflective volumetric hologram, and other diffraction elements may be adopted. For example, a configuration including a transmission-type volumetric hologram on a surface that light from the EL display 51 enters may be adopted, a surface relief hologram having recesses and protrusions on a surface of a base material may be adopted.

E. Other Configuration Examples (1) Further, the present disclosure includes the following configuration examples as the display device. One display device includes a correction unit configured to correct a chromaticity range of a color original image, an image formation unit configured to form an image with the chromaticity range that is corrected and emit the image as image light, an optical system configured to guide the image light to a display position, and a first diffraction optical element configured to deflect a traveling direction of the image light toward an observer in the optical system. The correction unit of the display device limits causes, of image light entering the first diffraction optical element, a chromaticity range of image light entering at a first angle to be close to a chromaticity range of image light entering at a second angle larger than the first angle by limiting, of the original image, a chromaticity range of an image at a position corresponding to the first angle. With this, color unevenness can be prevented from being caused in a deflecting direction of the first diffraction optical element.

(2) In such display device, when, of the original image, a chromaticity range that an image at a position corresponding to the first angle possibly takes is referred to as a chromaticity range at a small angle of view, of the original image, a chromaticity range that an image at a position corresponding to the second angle possibly takes is referred to as a chromaticity range at a large angle of view, and of the original image, a chromaticity range that an image at a position between the position corresponding to the first angle and the position corresponding to the second angle possibly takes is referred to as a center chromaticity range, the chromaticity range at a small angle of view may be larger than the center chromaticity range, and the center chromaticity range may be larger than the chromaticity range at a large angle of view.

In this manner, it is only required to limit each of the chromaticity range so that deviation among the chromaticity ranges of the three is reduced, and correction can be performed easily.

(3) In such display device, the correction unit may limit a chromaticity range of an image at a position corresponding to the chromaticity range at a large angle of view to be larger than a chromaticity range of an image at a position corresponding to the center chromaticity range. In this manner, color unevenness prevented from being caused.

(4) In such display device, the color original image may be a full color image being reproduceable with three primary colors. Further, when the chromaticity range is indicated with an XY chromaticity coordinate in an XYZ color system, the correction unit may cause a first triangle to be close to a second triangle by limiting the chromaticity range of the original image, the first triangle indicating a chromaticity range of image light entering at the first angle with the XY chromaticity coordinate, the second triangle indicating a chromaticity range of image light entering at the second angle with the XY chromaticity coordinate. In this manner, correction of the chromaticity range can be indicated with a coordinate, and contents of the correction can be clarified.

(5) In such display device, the first triangle may overlap with the second triangle by 80% or more in area. When 80% or more of the chromaticity range overlaps, color unevenness is sufficiently suppressed.

(6) In such display device, the optical system may include a light-guiding body configured to guide the image light. Of an incident side on which image light enters the light-guiding body and an emission side on which the image light is emitted from the light-guiding body, the first diffraction optical element may be provided on the emission side. Color unevenness due to the diffraction optical element on the emission side is a major cause for color unevenness. Thus, when the diffraction optical element on the emission side is the first diffraction optical element, color unevenness is easily prevented from being caused.

(7) Such display device may further include, in the optical system, a second diffraction optical element configured to deflect a traveling direction of the image light. Of an incident side on which image light enters the light-guiding body and an emission side on which the image light is emitted from the light-guiding body, the second diffraction optical element may be provided at a position on the incident side. In this manner, the image light is deflected by the diffraction optical elements on both the incident side and the emission side, and hence the display device can be reduced in thickness.

(8) In the above-mentioned display device, the second diffraction optical element may be a reflective volumetric hologram formed of a planar interference pattern. The reflective volumetric hologram selectively diffracts light having a specific wavelength, and hence light having other wavelengths is not blocked. Therefore, the optical system with respect to light of a plurality of wavelengths forming the original image can be designed easily.

(9) In such display device, the first diffraction optical element may be a reflective volumetric hologram formed of a planar interference pattern. The reflective volumetric hologram selectively diffracts light having a specific wavelength, and hence light having other wavelengths passes therethrough. Therefore, when a reflective hologram formed of such planer interference patterns is adopted as the first diffraction optical element, high transmittance can be achieved, and an outside scene and an image formed by the image formation unit can be visually recognized easily at the same time.

(10) In such display device, the image light emitted from the image formation unit may contain first image light, second image light, and third image light that have different wavelengths, and the first diffraction optical element may be obtained by laminating or superposing a first interference pattern corresponding to a wavelength of the first image light, a second interference pattern corresponding to a wavelength of the second image light, and a third interference pattern corresponding to a wavelength of the third image light. In this manner, a color image formed by the first image light, the second image light, the third image light that have different wavelengths can be displayed easily.

(11) In such display device, the first image light may have a peak wavelength of red (R), the second image light may have a peak wavelength of green (G), and the third image light may have a peak wavelength of blue (B). In this manner, the display device can perform display in a full color.

(12) The present disclosure includes a display method of displaying an image based on a color original image. The display method includes guiding image light corresponding to the original image to a display position by an optical system, and deflecting a traveling direction of the image light to an observer and performing display by a diffraction optical element. At the time of displaying the original image, with regard to a chromaticity range of the color original image, of image light entering the first diffraction optical element, a chromaticity range of image light entering at a first angle is caused to be close to a chromaticity range of image light entering at a second angle larger than the first angle by limiting, of the original image, a chromaticity range of an image at a position corresponding to the first angle. In this manner, during display of a color image, color unevenness can be prevented from being caused in the diffraction optical element.

The present disclosure is not limited to the exemplary embodiment described above, and can be realized in various configurations without departing from the gist of the present disclosure. For example, appropriate replacements or combinations may be made to the technical features in the exemplary embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

The present disclosure is not limited to the exemplary embodiment described above, and can be realized in various configurations without departing from the gist of the present disclosure. For example, appropriate replacements or combinations may be made to the technical features in the exemplary embodiment which corresponds to the technical features in the aspects described in the SUMMARY section to solve some or all of the problems described above or to achieve some or all of the advantageous effects described above. Additionally, when the technical features are not described herein as essential technical features, such technical features may be deleted appropriately. For example, a part of the configuration achieved with hardware in the exemplary embodiments may be achieved by software.

What is claimed is:

1. A display device comprising:
a correction unit configured to correct a chromaticity range of a color original image;
an image formation unit configured to form an image, based on the color original image, with the chromaticity range corrected and emit the image as an image light;
an optical system configured to guide the image light to a display position; and
a first diffraction optical element configured to deflect a traveling direction of the image light toward an observer in the optical system,
wherein the image light entering the first diffraction optical element includes a light entering at a first angle and a light entering at a second angle that is larger than the first angle, the correction unit limits a chromaticity range of the image of the color original image at a position corresponding to the light entering at the first angle to be close to a chromaticity range of the light entering at the second angle.

2. The display device according to claim 1, wherein, when
a possible chromaticity range of an image, of the original image, at a position corresponding to the first angle is referred to as a chromaticity range at a small angle of view,
a possible chromaticity range of an image, of the original image, at a position corresponding to the second angle is referred to as a chromaticity range at a large angle of view, and
a possible chromaticity range of an image, of the original image, at a position between the position corresponding to the first angle and the position corresponding to the second angle is referred to as a center chromaticity range,
the chromaticity range at a small angle of view is larger than the center chromaticity range, and
the center chromaticity range is larger than the chromaticity range at a large angle of view.

3. The display device according to claim 2, wherein
the correction unit limits a chromaticity range of an image at a position corresponding to the chromaticity range at a large angle of view to be larger than a chromaticity range of an image at a position corresponding to the center chromaticity range.

4. The display device according to claim 1, wherein
the color original image is a full color image being reproduceable with three primary colors, and
when the chromaticity range is indicated with an XY chromaticity coordinate in an XYZ color system, the correction unit limits the chromaticity range of the original image to cause a first triangle to be close to a second triangle, the first triangle indicating a chromaticity range of image light entering at the first angle with the XY chromaticity coordinate, the second triangle indicating a chromaticity range of image light entering at the second angle with the XY chromaticity coordinate.

5. The display device according to claim 4, wherein the first triangle overlaps the second triangle by 80% or more in area.

6. The display device according to claim 1, wherein
the optical system includes a light-guiding body configured to guide the image light, and
among an incident side on which image light enters the light-guiding body and an emission side on which the image light is emitted from the light-guiding body, the emission side is where the first diffraction optical element is provided.

7. The display device according to claim 6, further comprising, in the optical system, a second diffraction optical element configured to deflect a traveling direction of the image light, wherein
among an incident side on which image light enters the light-guiding body and an emission side on which the image light is emitted from the light-guiding body, the incident side is where the second diffraction optical element is provided.

8. The display device according to claim 7, wherein
the second diffraction optical element is a reflective volumetric hologram formed of a planar interference pattern.

9. The display device according to claim 1, wherein
the first diffraction optical element is a reflective volumetric hologram formed of a planar interference pattern.

10. The display device according to claim 1, wherein
the image light emitted from the image formation unit includes first image light, second image light, and third image light that have different wavelengths, and
the first diffraction optical element is obtained by laminating or superposing a first interference pattern corresponding to a wavelength of the first image light, a second interference pattern corresponding to a wavelength of the second image light, and a third interference pattern corresponding to a wavelength of the third image light.

11. The display device according to claim 10, wherein
the first image light has a peak wavelength of red (R),
the second image light has a peak wavelength of green (G), and
the third image light has a peak wavelength of blue (B).

12. A display method for displaying an image based on a color original image, the display method comprising;
guiding, by an optical system, an image light corresponding to the color original image to a display position; and
deflecting, by a diffraction optical element, a traveling direction of the image light to an observer to display the color original image, wherein
the image light entering the first diffraction optical element includes a light entering at a first angle and a light entering at a second angle that is larger than the first angle,
upon display of the color original image, a chromaticity range of the image of the color original image at a position corresponding to the light entering at the first angle is limited to be close to a chromaticity range of the light entering at the second angle.

* * * * *